United States Patent [19]
Müller et al.

[11] Patent Number: 5,187,520
[45] Date of Patent: Feb. 16, 1993

[54] PHOTOGRAPHIC COPYING APPARATUS

[75] Inventors: Kurt Müller, Weiningen; Roberto Rupp, Brugg, both of Switzerland

[73] Assignee: Gretag Systems, Inc., Bothell, Wash.

[21] Appl. No.: 899,365

[22] Filed: Jun. 16, 1992

[30] Foreign Application Priority Data

Jun. 24, 1991 [DE] Fed. Rep. of Germany ..... 91810493

[51] Int. Cl.⁵ .............................................. G03B 27/58
[52] U.S. Cl. .................................... 355/72; 355/308
[58] Field of Search .............. 355/72, 64, 308, 309, 355/321; 271/145, 9, 157, 158, 160, 162, 279, 213, 214

[56] References Cited

U.S. PATENT DOCUMENTS

| | | | |
|---|---|---|---|
| 4,092,067 | 5/1978 | Grossmann | 355/77 |
| 4,101,216 | 7/1978 | Grossmann | 355/35 |
| 4,108,427 | 8/1978 | Komori et al. | 271/9 |
| 4,843,430 | 6/1989 | Huber et al. | 355/27 |
| 4,853,742 | 8/1989 | Payrhammer et al. | 355/72 X |
| 4,970,548 | 11/1990 | Shibata et al. | 355/72 |
| 5,044,620 | 9/1991 | Ruch et al. | 271/9 |
| 5,066,973 | 11/1991 | Kuwabara | 355/72 |
| 5,102,112 | 4/1992 | Takahashi | 271/9 |
| 5,103,255 | 4/1992 | Sonobe | 355/72 X |

FOREIGN PATENT DOCUMENTS

| | | |
|---|---|---|
| 3713170 | 11/1988 | Fed. Rep. of Germany . |
| 3713171 | 11/1988 | Fed. Rep. of Germany . |
| 0167835 | 8/1985 | Japan .............................. 271/162 |

Primary Examiner—A. T. Grimley
Assistant Examiner—Sandra L. Brasé
Attorney, Agent, or Firm—Burns, Doane, Swecker & Mathis

[57] ABSTRACT

A photographic copy apparatus for processing of photographic copy material housed in mobile cassettes, at least two cassettes being combined on either side of an exposure station in a block so that the cassettes on an inlet side are approximately opposite cassette openings of cassettes on an outlet side. The cassette openings of the cassettes in their working position are aligned with the transport path for the copy material and additional cassettes behind those in their working position are aligned with a parallel to the transport path. Transport devices are provided above the cassettes combined in blocks for their exchange.

23 Claims, 8 Drawing Sheets

PHOTOGRAPHIC COPYING APPARATUS

BACKGROUND OF THE INVENTION

The invention concerns a photographic copying apparatus for the processing of photographic copy material suitable for housing in movable cassettes.

In professional photographic laboratories at the present time, photographic copies—paper images—are produced usually from photographic masters—for example, negatives—by extensively automated photographic copying machines, the so-called photographic printers. The operating personnel in the case of such machines has what are essentially monitoring functions and assures a working process that is as continuous as possible. For this purpose, the operating personnel takes care of the master material—for example negative films—and in particular must make certain that there is always sufficient copy material—unexposed photographic paper—present and that on the other hand, the exposed copy material is taken in time from the copy apparatus. In the case of modern photographic copy machines the unexposed photographic copy material is usually present as a so-called roll material, wound on a winding core in a movable light-tight storage cassette. This cassette may be hooked up on the inlet side of the photographic copy apparatus. Automatic gripping and transportation means in the copy apparatus move the copy material through the apparatus. On the outlet side, an empty winding cassette may be attached, which again is light tight and movable. The exposed copy material is automatically threaded in the winding cassette and wound onto its winding core.

Photographic copy machines with automatic copy material transportation using movable storage cassettes for the unexposed copy material and winding cassettes for the exposed material, are known from commercially available devices of this generic type. In the case of these known copy apparatuses, the operating personnel must replace empty storage and full winding cassettes in time, and a new full paper storage cassette and a new empty winding cassette must be attached as rapidly as possible in order to avoid extended downtimes of the copy apparatus. The downtime of the copy apparatus is thus essentially dependent on the reaction time of the operating personnel. Furthermore, the manual changing of cassettes is also rather time consuming. It is therefore necessary for the operating personnel to be ready for the changing of cassettes at exactly the right moment, as otherwise the copy apparatus will be down for an unnecessarily long period of time. As at the present time operators usually operate several machines simultaneously, exact timing is required which in turn requires a very high degree of attention on the part of the personnel necessary. There is little time left for the other tasks, for example, the changing of copy masters. In particular, when transferring to photographic copy machines with hourly outputs of 15,000 or more images, it is almost impossible to perform all of these tasks.

In order to remedy this disadvantage in the case of another known photographic copy apparatus, it has been proposed to mount a plurality of storage and winding cassettes both on the inlet and the outlet side of the copy apparatus on a vertical rotating disk of a separate cassette carriage. Following the emptying of a storage cassette and the filling of a winding cassette, the rotating disks are automatically rotated and a new storage cassette or winding cassette is brought into a processing position. If the cassettes are considered relatively large and heavy, it is readily apparent that this approach would require special, high performance drives for the rotating disk, which in turn must be very large and in particular would render the apparatus enormously expensive. Furthermore, in view of the relatively heavy weight of the cassettes, their mounting and fastening on the rotating disk would again render an additional expenditure necessary. The overall layout becomes very large and in particular very heavy and is very cumbersome to transport.

It is proposed in U.S. Pat. No. 4,853,742 to arrange, for example, two storage and two winding cassettes in succession at the copy material inlet and the copy material outlet side of the copy apparatus. On both the inlet and output sides, pulling means are provided on the copy apparatus that may be applied to the cassettes to draw a cassette into its processing position. To remove empty storage cassettes and full winding cassettes from the processing position, additional pushing devices acting perpendicular to the drawing means are provided. The copying apparatus described is relatively complex and expensive in its configuration. The placement in succession of at least two cassettes in each case appreciably increases the space requirements of the copying apparatus. Additional guidance and positioning means are required at the bottom for the cassettes being readied, which in case of the absence of cassettes inserted, may become a dangerous obstacle for the operating personnel. The same is even more true for the extendable and retractable tension and pushing devices at the copying apparatus.

In DE-A-3 713 171, a photographic copying apparatus is described in which two or three storage cassettes and winding cassettes are provided adjacent or in succession to each other. In the case of adjacent cassettes, it is shown that they may be located either parallel to or at an oblique angle to the direction of transport. Depending on how the cassettes are arranged relative to the direction of transport of the copy material, deflecting and guide means are provided, whereby the copy material is to be guided from each storage cassette into the direction of transport, and from said direction to the winding cassette involved. In these deflecting devices, the copy material is guided in the form of a loop in the direction required. In these deflecting and guiding devices the risk of injury to the coating of the photographic copy material is relatively high. In addition, in this copying apparatus the cassettes considerably project over the dimensions of the apparatus, so that space requirements are considerably increased. It must be assured by means of additional display means that the operator always removes the correct empty or full cassette from the cassette package and replaces it with a full or empty cassette.

SUMMARY OF INVENTION

It is therefore an object of the present invention to eliminate all of these disadvantages of the known photographic copying machines. In particular, a photographic copying apparatus is to be created, making possible continuous operation at high copy outputs and simultaneously relieving the operating personnel of the additional task of monitoring the fill stand of the cassettes. In exemplary embodiments, cassettes applied to the apparatus and other cassettes attached to it project only slightly over the dimensions of the copy apparatus;

additional deflecting and guiding means are avoided; no guide or positioning devices are located at the bottom in front of the copy apparatus; and not tension or pushing means are extendable from the machine.

All these and other objects are attained by a photographic copying apparatus according to exemplary embodiments of the invention. In particular, in the case of an exemplary copying apparatus according to the invention, at least two cassettes may be applied on both sides of the exposure station to form a block so that the cassette openings of the paper storage cassettes on the inlet side and of the winding cassettes on the outlet side are approximately opposite each other. They are aligned with the transport path for the copy material or with a parallel extending behind the transport path relative to the depth of the apparatus. The cassettes, which may be combined into a block, may be moved by means of transportation devices provided at the copy apparatus both on the inlet and the outlet sides, transversely to the transport path of the copy material. In this manner, the cassette in the rear relative to the depth of the apparatus may be moved into its working position, while the cassette in the front cassette may be moved out of the working position transversely to said transport path.

It is especially advantageous to locate at least two cassettes each at the inlet and the outlet side of the exposure station in approximately parallelepiped shaped control places. It is assured in this manner that the cassettes that may be combined in a block project only slightly past the dimensions of the copy apparatus. Advantageously, it is found that the depth of the copy apparatus should not exceed 80 cm. To facilitate the positioning of the cassettes in their control locations, preferably positioning means are mounted on the copy apparatus.

In a particularly advantageous fashion, the transportation device provided at both the inlet and the outlet side of the exposure station is in the form of a cassette crane located above the cassettes on the copy apparatus and displaceable transversely to the transport path of the copy material. The cassette crane advantageously comprises a trolley moving in lateral guides located transversely to the transport path of the copy material in the copy apparatus from one terminal position horizontally, and a lifting plate located below said cassette crane and moving together with the trolley horizontally, said lifting plate being vertically adjustable relative to the trolley. Spindle drives are particularly suitable as height adjusting means for the lifting plate; they also save space. The spindle columns are preferably located on the lifting plate and are engaging rotating spindle nuts mounted on the trolley. The lifting and lowering of the lift plate without tilting is assured simply by the coupling of the rotating nuts with each other, preferably by a toothed belt, which in turn is driven by a variable drive motor mounted on the trolley. Two guide columns, extending from the surface of the lift plate and guided by two corresponding guide bores in the trolley, provide an even more efficient guidance of the lift plate during vertical adjustments.

In a particularly preferred manner, the horizontal displacement of the trolley transversely to the transport direction of the copy material is effected with a spindle drive. The latter comprises a drive motor fixedly connected with the frame of the copy apparatus, a rotating spindle rod joined in rotation with the rotor of the drive motor and a spindle nut engaging the spindle rod and displaceable along the threaded part of the spindle rod, said spindle nut being connected with the trolley. The trolley may be displaced especially well and without tilting, if its lateral guides are in the form, on the one hand of a slot guide wherein a support roller laterally mounted on the trolley is moving, and on the other, of a support shaft passing through a bore in the trolley extending parallel to the horizontal direction of movement.

In order to insure that a cassette may be received without jolting, on the edges of the width of the lift plate two locating pins are provided on the top side. Following introduction of the lift plate into two lateral guides and abutments extending on the top side of the cassette transversely to the transport path of the copy material, the two locating pins are inserted into bores in the lateral abutments. The width of the lift plate approximately corresponds to the width of the cassette, and preferably it is slightly narrower.

On the outlet side of the exposure station, the copy apparatus preferably is equipped with a drive mechanism for the winding core of the winding cassette, which preferably may be moved between two terminal positions: from a first position in which it is engaging the drive transfer means of the camera attached, into a second position in which it is disengaged from the drive transfer means, and vice versa. The drive transfer means preferably are located in a recess on a front surface of the winding cassette on the opening side. It is particularly advantageous when the drive mechanism for the winding core consists of a motor driven toothed wheel mounted on a pivoting arm, and when the drive transfer means consists of a flat belt with teeth on either side running over two toothed wheels located in the recess on the front side of the cassette, one of which may be displaced against a spring force in the direction of the second toothed wheel, while the second toothed wheel is stationary and joined in rotation with a third coaxial toothed wheel, which in turn is coupled preferably by a transmission belt with the winding core of the winding cassette.

The pivot arm is preferably pivoted by a motor with the aid of a second spindle drive. In the process, a spindle rod fastened to the pivot arm engages a motor rotated spindle nut stationarily mounted in the copy apparatus so that by rotating the spindle nut clockwise or counterclockwise, the spindle rod is moved in or out of the copy apparatus, thereby pivoting the arm from one terminal position into the other, and vice versa.

To facilitate the horizontal displacement of the cassettes, the receptor opening provided on both the inlet and the outlet side of the copy apparatus may be retracted from a working position in which they project on the side of the exposure station from the copy apparatus and enclose the cassette openings in a light tight manner, into a second position, in which they release the openings of the cassettes still in their working position, to be replaced. It is especially advantageous if the receptacles are moved in and out by a motor, preferably by means of a spindle drive.

To improve the hold of the cassettes in their working position, preferably under each receptacle an arresting sleeve is provided on the copy apparatus. The sleeve is moved in and out be a motor, for example by means of a spindle drive, and by releasably engaging a corresponding pin located under the cassette opening on the front side of the cassette.

The cassettes are preferably suspended in their working position from their cassette crane, as in this case uneven bottoms are immaterial.

It has been found particularly advantageous to use storage and winding cassettes specially modified for a copy apparatus according to the invention. These cassettes have a configuration identical with known cassettes relative to their cassette opening or the arresting pin. A novel feature of the inventive cassettes is that the drive transmission means no longer consist of a lateral, coaxial toothed wheel located outside the cassette and fixedly connected in rotation with the winding core. Rather, the drive transmission means are placed in a recess on a front surface of the cassette on the opening side. This recess is obviously sealed in a light tight manner toward the inside of the cassette. In a preferred exemplary embodiment, the inventive drive transmission means comprises a bilaterally toothed flat belt guided over two toothed wheels located in the recess. One of the toothed wheels, for example the upper one, may be displaced against the force of a spring in the direction of the second toothed wheel over a short path. The second toothed wheel is stationary and is joined fixedly in rotation with a third coaxial toothed wheel. A transmission belt connects the third toothed wheel with the winding core. In this manner, the rotating motion is transmitted from the drive means in the copy apparatus to the flat belt to the extent possible without jolting the winding core.

BRIEF DESCRIPTION OF THE DRAWINGS

Further particularly advantageous variants of exemplary embodiments of a copy apparatus according to the invention will become apparent from the following detailed description with reference to the exemplary embodiments shown in the figures, wherein in partially schematic views.

DETAILED DESCRIPTION OF THE PREFERRED EMBODIMENTS

Figure 1:
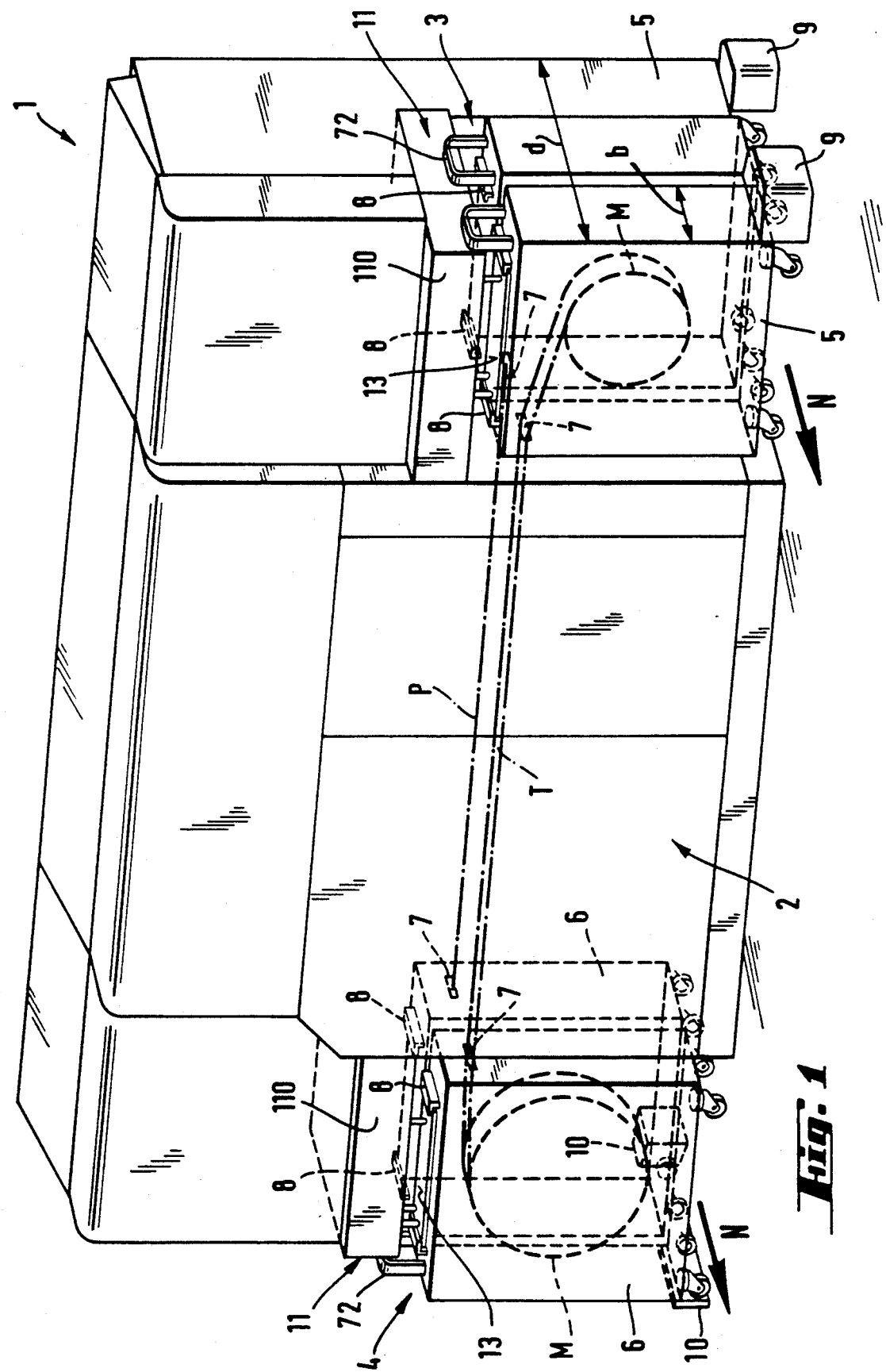
FIG. 1 shows an exemplary photographic copy machine according to the invention with the cassettes attached.
Figure 2:
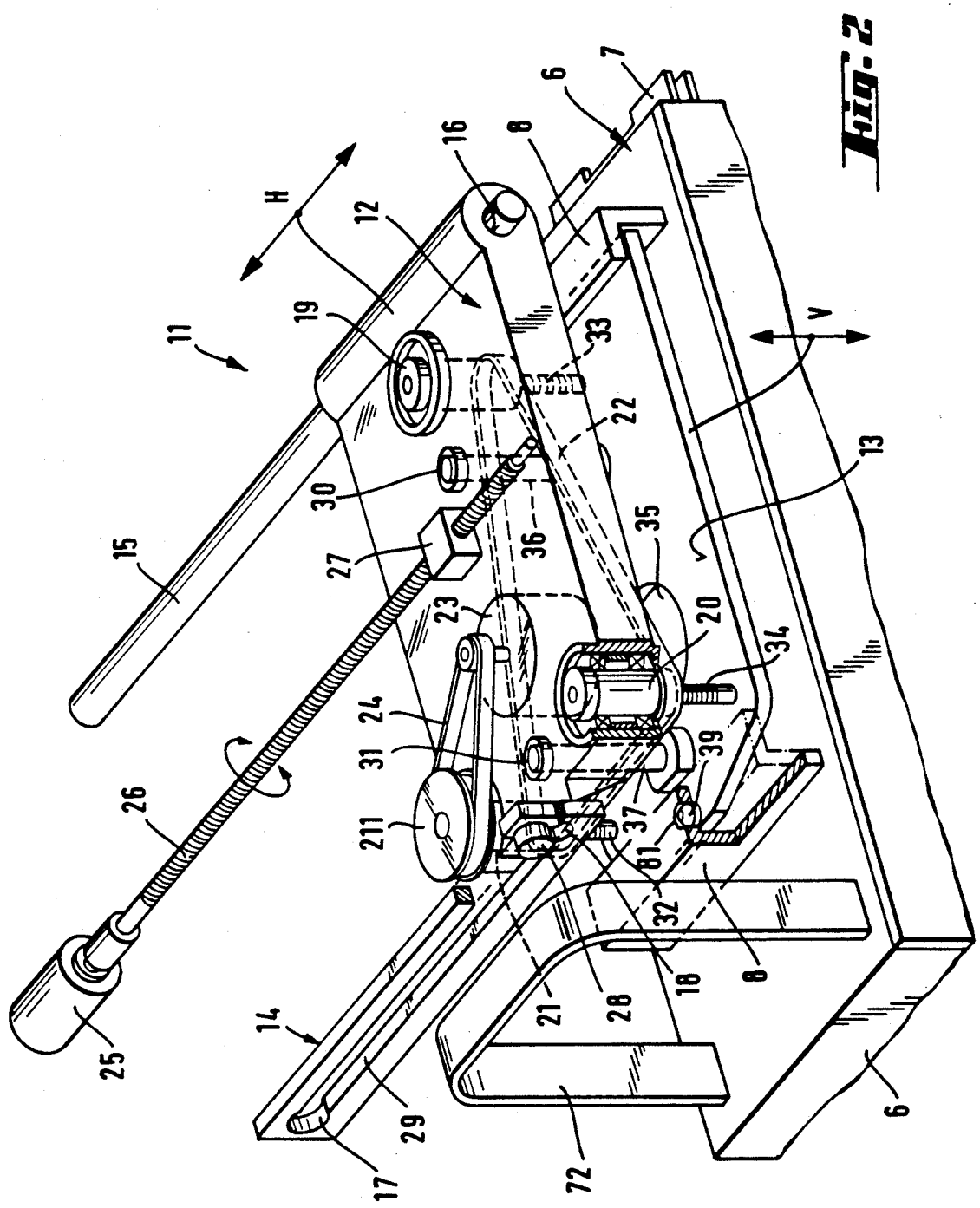
FIG. 2 shows an exemplary embodiment of a cassette crane with a horizontally displaceable trolley and a vertically adjustable lift plate.
Figure 3:
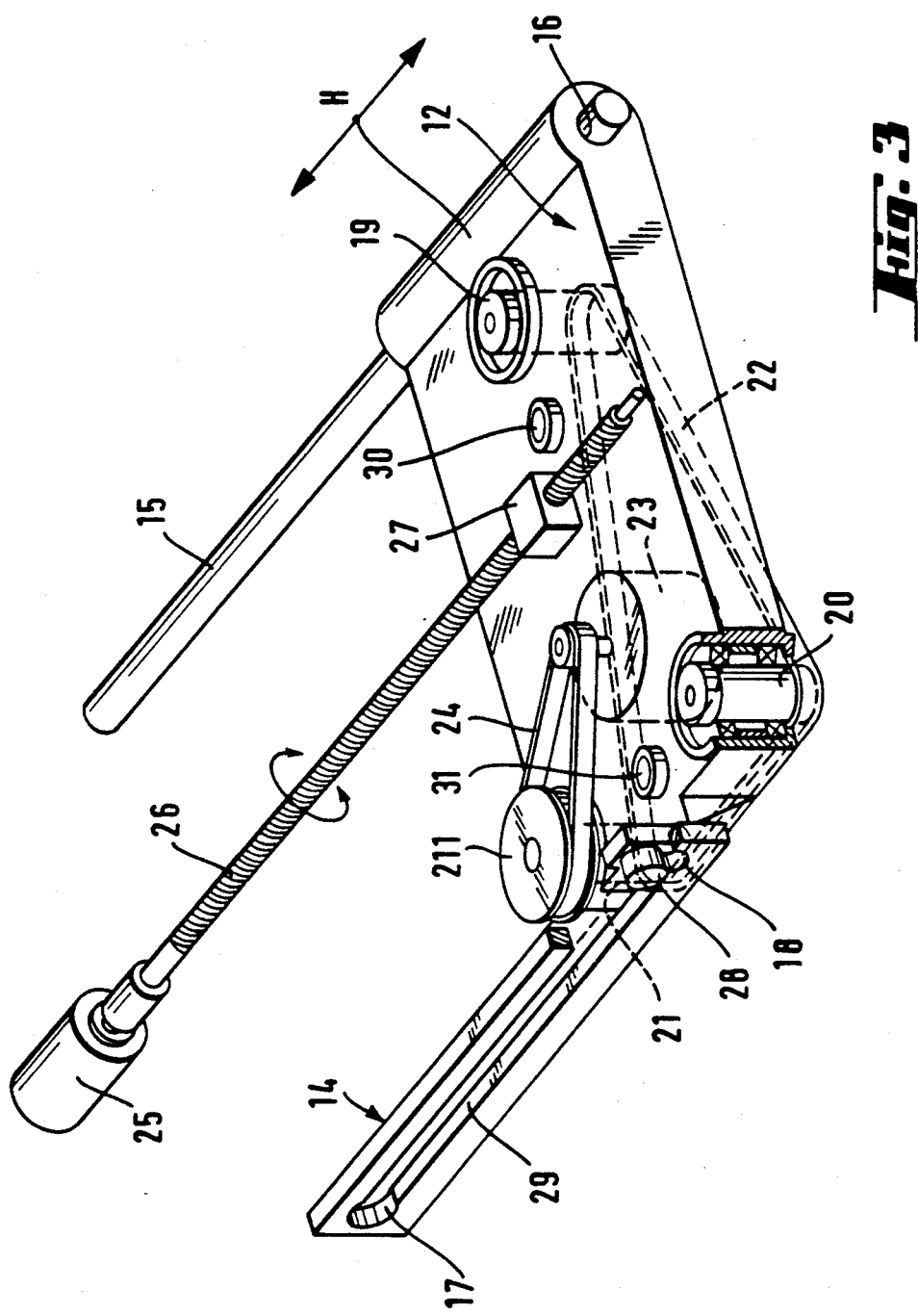
FIG. 3 shows a trolley designated 12 in FIG. 2 with a horizontal displacing device.

A photographic copy machine according to the invention is generally designated in its entirety by 1 in FIG. 1. In particular, it is a copy apparatus whereby photographic copy material may be introduced automatically from the opening 7 of an attached storage cassette 5, into the copy apparatus 1, into a transport path T and threaded into a cassette opening 7 of an attached winding cassette 6, after passing through an exposure station 2. Automatic operation using the foregoing principal is described, for example, in U.S. Pat. No. 4,092,067 or U.S. Pat. No. 4,101,216 and also in U.S. Pat. No. 4,853,742 or DE 3 713 171, the disclosures of which are hereby incorporated by reference in their entireties. The description of a photographic copy apparatus according to the invention is thus restricted to the differences of the FIG. 1 machine which are relevant to the invention of this type of apparatus with automated copy material transportation.

At the inlet side of the exposure station 2 of the copy apparatus, a storage cassette 5 is shown and on the outlet side, winding cassettes 6 are shown. In particular, two cassettes 5 and 6 are always combined in a block so that the cassette openings 7 of the storage cassettes 5 and of the winding cassettes 6 are located approximately opposite each other. The cassette openings 7 of the storage cassette 5 in the working position and of the winding cassette 6 are aligned with the transport path T for the copy material. The rear storage and winding cassettes 5 and 6 relative to the depth of the apparatus are aligned with a parallel P to the transport path T. Above the combined blocks of storage and winding cassettes 5 and 6, transport means 11 are provided both on the inlet and outlet side. In particular, these transport means 11 are capable of transporting the storage cassettes 5 on the inlet side and the winding cassettes 6 on the outlet side transversely to the transport path T for the copy material M. In this manner, the cassettes in the rear position are moved into their working position (wherein their openings 7 are aligned with the transport path T), while simultaneously the front cassettes may be moved out of their working position in a direction N perpendicular to the transport path T. As the cassettes are normally movable, the cassettes in front are preferably pushed out of the working position by the rear cassettes during the transverse motion of the latter.

On either side of the exposure station 2, approximately parallelepiped shaped control locations 3,4 are provided at the copy apparatus. These control locations 3,4 are dimensioned so that the cassettes 5 and 6 combined in a block extend only slightly past the longitudinal extent of the copy apparatus 1. In particular, only the rear end of the cassettes, which carries on its top side a handle (72) or the like, projects by about 10-20 cm over the length of the copy apparatus. This minimizes the space requirements of the copy apparatus. According to FIG. 1 two cassettes may always be combined in a block, but in case of greater depths d of the apparatus, control locations for more than two cassettes may be provided. However, in view of the usual widths of the cassettes, the control locations preferably have room for two cassettes in order to assure that the depth d of the photographic copy apparatus does not exceed 80 cm. This depth d of 80 cm is significant, because it corresponds to the internal opening of the usual door frame and thus an apparatus of such a depth is just able to pass through the door.

To facilitate positioning of the cassettes in their control locations, positioning means 9, 10 are provided on the copy apparatus. Preferably, these are in the form of stops for the rear surface of the cassette opposite the cassette opening 7 and, in the area of the front cassette in the working position, in the bottom. The stops 9, 10 extend over the width b of the front cassette. The bottom area of the part of the control locations for the rear cassette is obstacle free, in order to make possible the unimpeded insertion of further storage or winding cassettes 5 and 6.

The transport devices 11 indicated FIG. 1 above the control location 3 on the inlet side and control location 4 on the outlet side on either side of the exposure station 2 are, for example, in the form of cassette cranes shown in more detail in FIGS. 2-6. According to FIG. 2, each of the cassette cranes comprise a trolley 12 capable of moving in the lateral guides 14 and 15 extending transversely to the transport path T for the copy material M between two terminal positions, in the horizontal direction H. The cassette cranes further comprise a lift plate 13 located under it, moving horizontally with the trolley 12 and being adjustable relative to the trolley 12 in the vertical direction V. The lift plate 13 is conveniently adjusted vertically by means of spindle drives which are particularly suitable and space saving as height adjusting means. For this, rotating spindle nuts 19, 2, 21 are provided on the trolley 12. The spindle nuts 19, 20, 21 are engaging the spindle columns 32, 33, 34, which extend from the surface of the lift plate 13.

Figure 4:
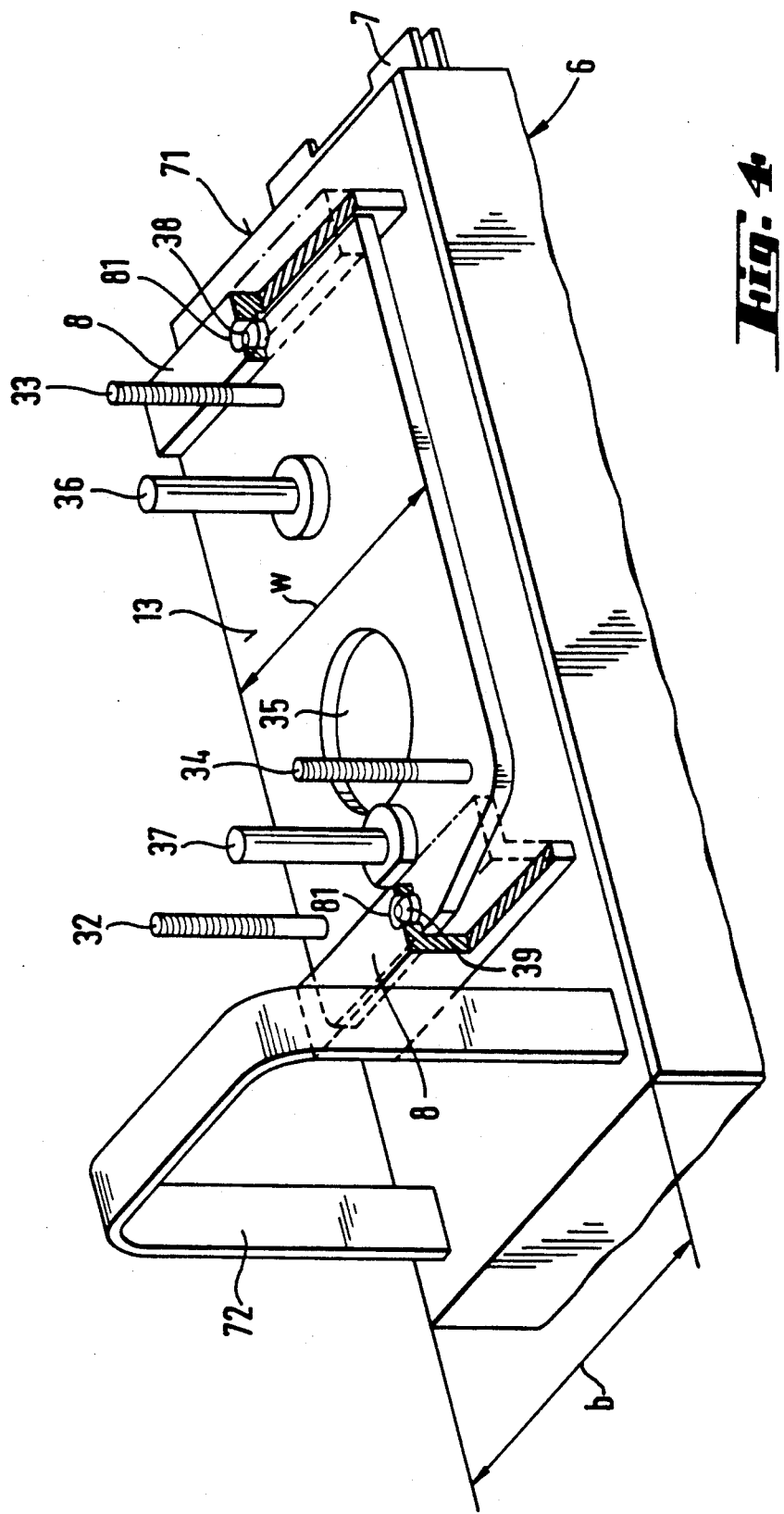
FIG. 4 shows the lift plate designated 13 in FIG. 2.

By rotating the spindle nuts 19, 20, 21 clockwise or counterclockwise, the lift plate 13 is raised or lowered relative to the trolley 12 which remains stationary at its level. The rotating spindle nuts 19, 20, 21 are advantageously coupled with each other to assure the motion of the lift plate 13 without tilting. Preferably, coupling is effected by means of a toothed belt 22, running over drive wheels 190, 200, 210 (FIG. 5) located on the bottom side of the trolley and connected fixedly in rotation with the appropriate spindle nuts 19, 20, 21 of FIG. 3. The spindle nuts 19, 20, 21 are actually driven by a variable motor 23 mounted on the trolley. The rotation of the rotor of the motor is transmitted by means of a drive belt 24 another drive wheel 211 located according to FIG. 3 on the top side of the trolley and fixedly joined in rotation with one of the spindle nuts, here the nut 21. In this manner, by driving by a motor one of the spindle nuts 21 by means of the coupling belt 22, the other spindle nuts 19, 20 are also driven. To guide the lift plate 13 even better in its vertical displacement, two guide columns 36, 37 (FIG. 4) extend from its top side and pass through two corresponding guide bores 30, 31 (FIG. 3) in the trolley and are displaceable therein. FIG. 4 shows an approximately circular opening 35 between the columns 36, 37. This opening 35 is intended to receive the motor 23 if the lift plate 13 is raised, said motor being located on the bottom side of the trolley according to the example shown. In this manner, the overall configuration of the cassette crane 11 is rendered very compact without the lower edge of the motor 23 interfering with the displacement of the lift plate 13.

Figure 5:
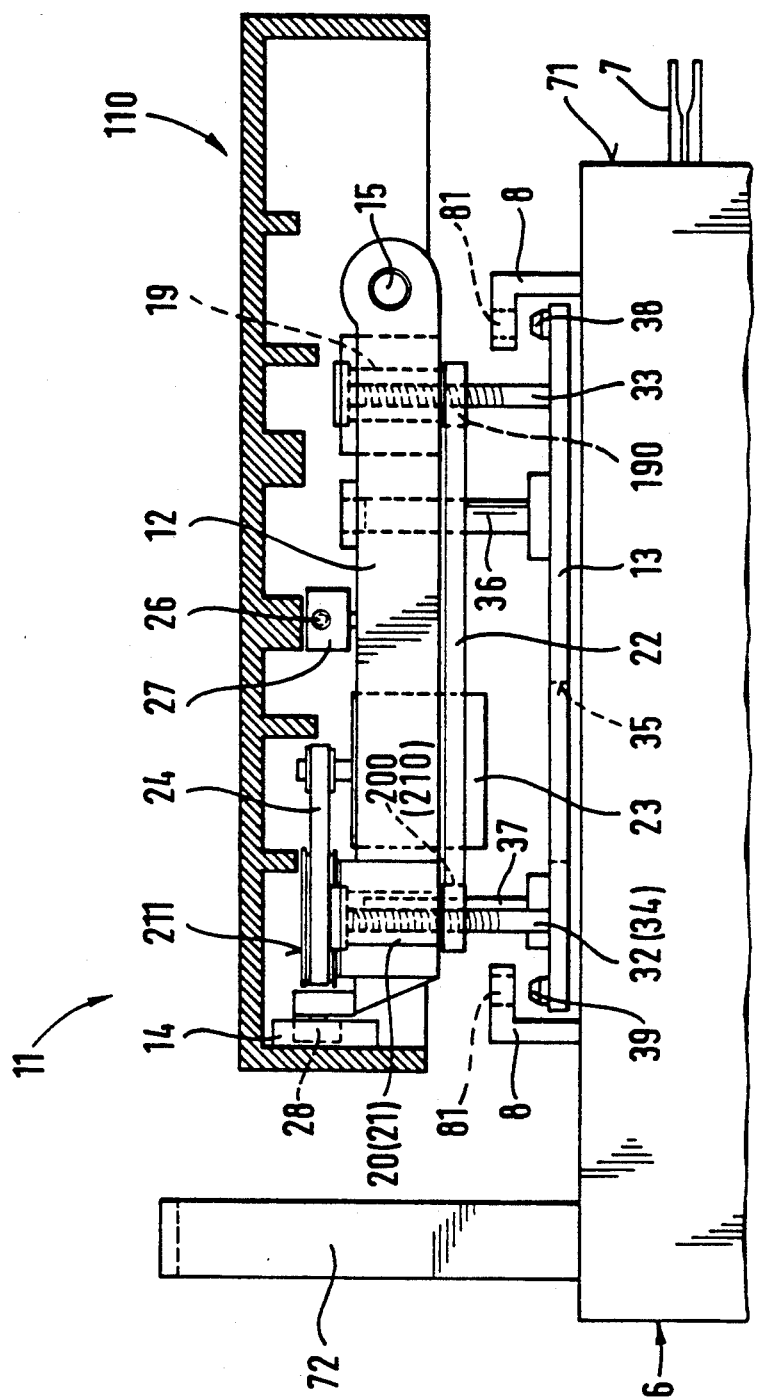
FIG. 5 shows the cassette crane with the cassette lowered.
Figure 6:
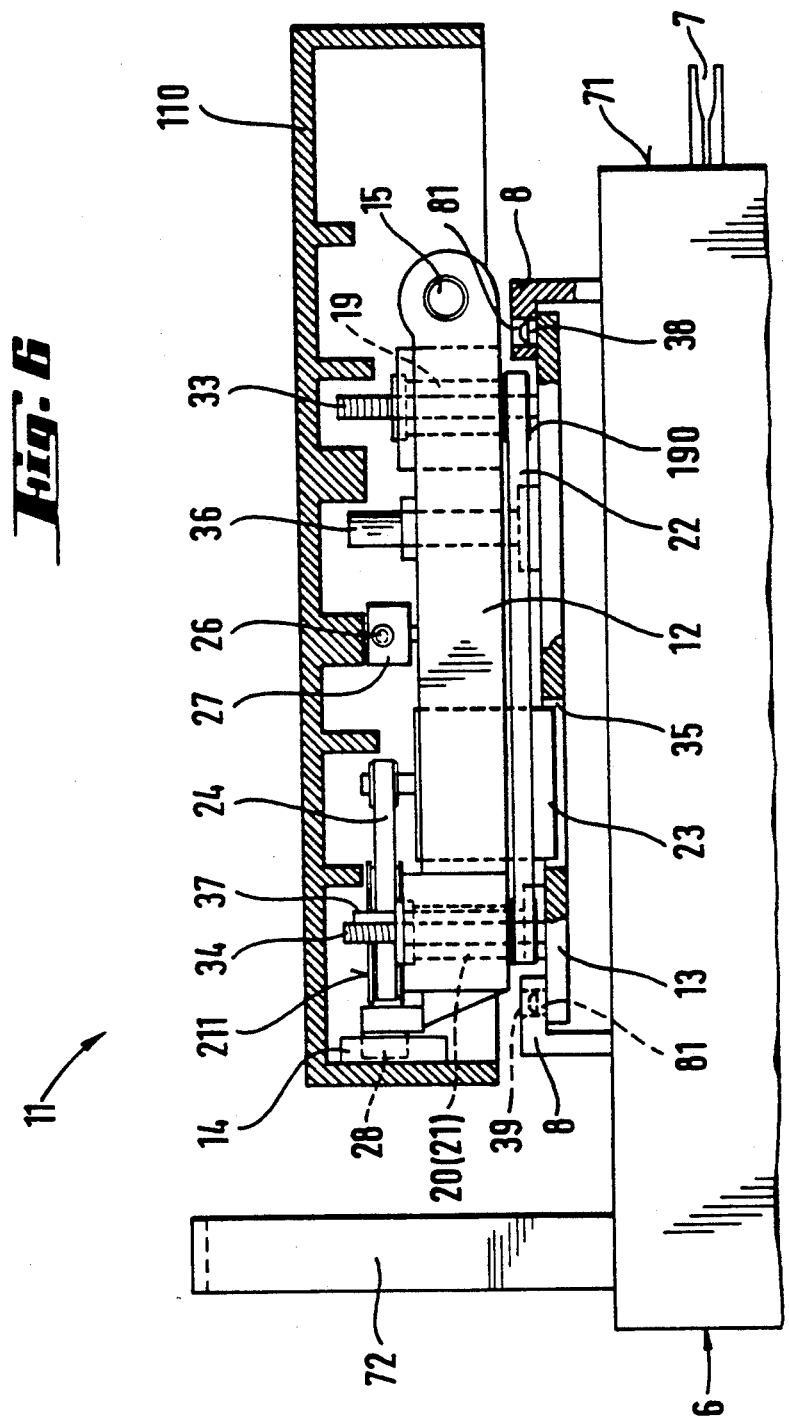
FIG. 6 shows the cassette crane with the cassette raised.

It is apparent that the layouts of the spindle nuts 19, 20, 21, the spindle columns 32, 33, 34, the guide columns 36, 37, the toothed belt 22, together with the drive wheels 190, 200, 210, 211, the motor 23 and the drive belt 24 shown, are merely examples. The spindle nuts could also be located in the lift plate, the spindle columns and guide columns could extend from the bottom side of the trolley and the layout of the drive wheels and drive and toothed belts may be different. Such modifications are readily apparent to those skilled in the art when considering equivalent solutions, and are encompassed by the invention. The trolley 12 is preferably displaced in the horizontal direction H transversely to the transport direction T of the copy material M by means of a spindle drive. This spindle drive comprises a variable drive motor 25 fixedly connected with the frame of the copy apparatus 1. A spindle rod 26 rotating around its longitudinal axis is connected fixedly in rotation with the rotor of the motor 25. The spindle rod 26 engages a spindle nut 27 located stationarily on the top side of the trolley 12. By rotating the spindle rod clockwise or counterclockwise, the trolley 12 is displaced along its lateral guides 14, 15 over the threaded part of the spindle rod 26 horizontally. The trolley 12 may be moved especially well and without tilting if its lateral guides 14, 15 are in the form, on the one hand, of a slot guide to receive a support shaft 28 located on a broad side of the trolley 12, and on the other hand of a support shaft guided in a bore 16 parallel to the direction of displacement H in the trolley 12. In the case of a slot guide 14, the support shaft 28 runs in a slot 29 between two trough like depressions 17 and 18, which determine the rear and the front terminal positions of the displacement. The slot guide 14 and the support shaft 15 may be fixed components of the frame of the copy apparatus 1, but, as indicated in FIGS. 1, 5 and 6, they may also be located inside a housing 110, which may be mounted in its entirety on the inlet and the outlet side of the exposure station 2, above the control locations 3 and 4 on the frame of the copy apparatus 1.

The storage and winding cassettes 5 and 6 are equipped with rollers, wheels of the like, making possible the movements of the cassette. In particular, the configuration of the rollers, wheels and the like is such that motions of the cassette in both the longitudinal direction and a perpendicular horizontal direction are possible. To facilitate the manual manipulation of the cassette, they are provided on their top side preferably with a handle 72 or the like. Again on the top side of the cassettes 5 and 6, two lateral guide rails 8 are provided for the lift plate 13, said guide rails extending perpendicularly to the longitudinal direction of the cassettes approximately over the entire width of the cassette. The guide rails are in the form of an angle iron and serve as a stop for the retracted lift plate 13. The distance between two guide rails 8 corresponds approximately to the length of the lift plate 13 so that the latter may be inserted reliably between the two lateral guide rails 8 without tilting (FIG. 5).

Preferably, the legs of the guide rails 8 serving as a stop have bores 81 into which locating pins 38, 39 located on transverse edges of the top side of the lift plate 13, may be inserted. In this manner each cassette is secured reliably against slippage when the lift plate 13 is raised (FIG. 6).

To insure that always only one of the cassettes 5, 6 arranged in a block in the appropriate control locations 3 and 4 is gripped by the lift plate 13, the width w of the lift plate 13 approximately corresponds to the width b of the cassettes. Preferably, the lift plate 13 is slightly narrower than the cassettes.

As the weight of the cassettes in the full state is not negligible, the cassette cranes 11 must be highly stable. Preferably, the most highly stressed parts, such as the lift plate 13, the lateral guides 14, 15, the spindles of the spindle drives and the guide columns, etc., are made of steel.

Figure 7:
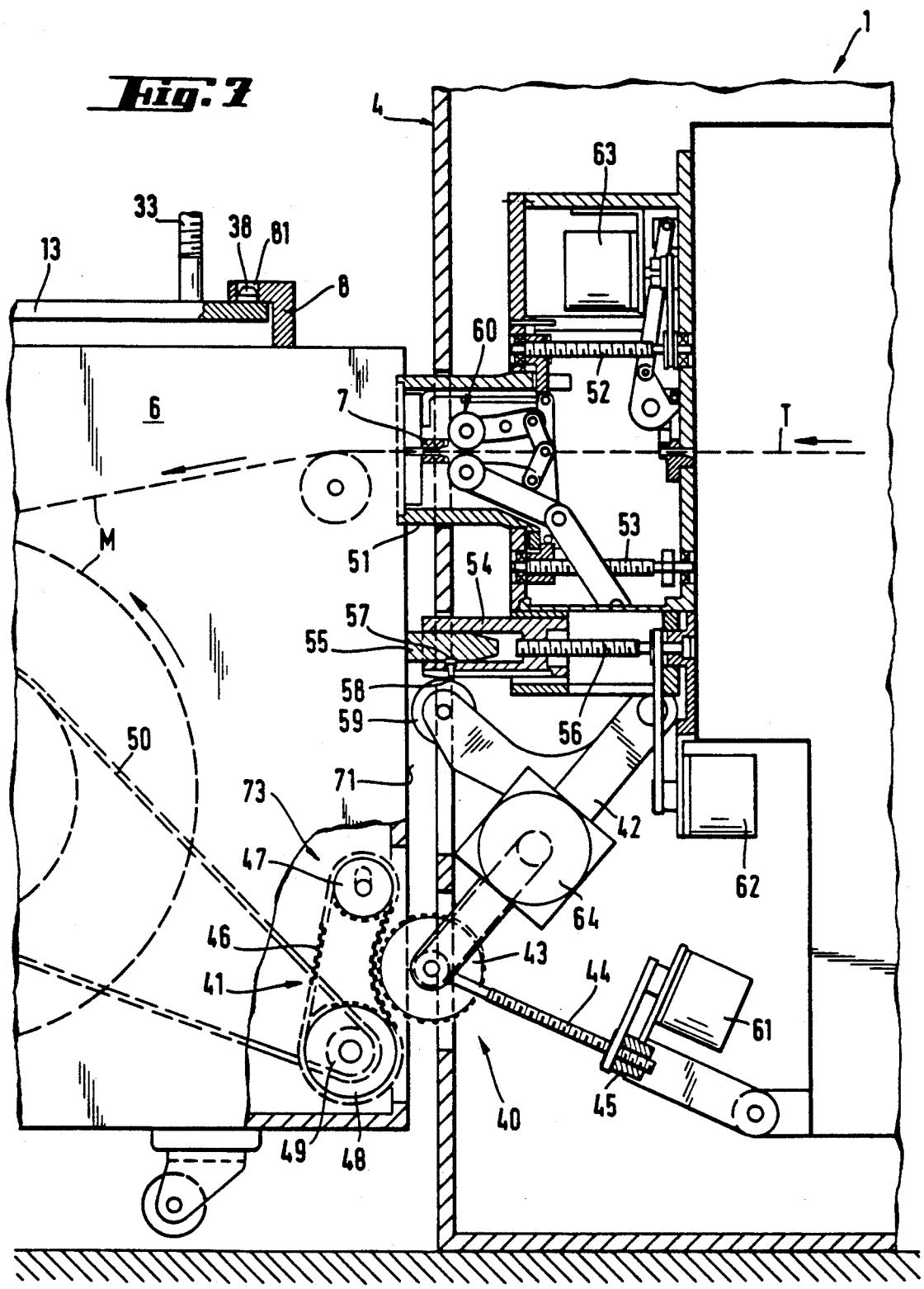
FIG. 7 shows an example of an interface between the cassette and the copy apparatus with the cassette attached.
Figure 8:
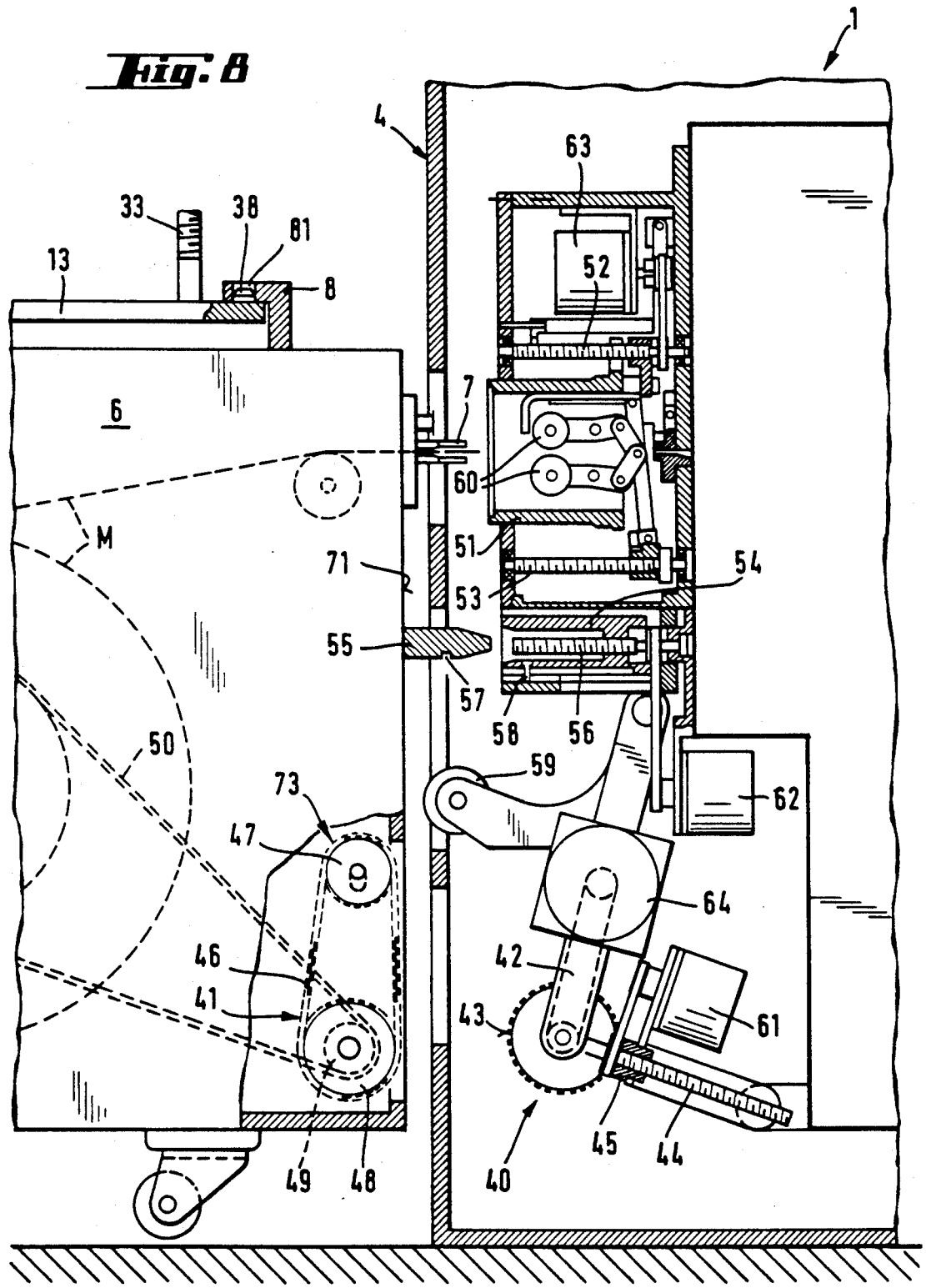
FIG. 8 shows the interface of FIG. 7 with the cassette removed.

On either side of the exposure station 2, attaching interfaces are provided for the storage and winding cassettes 5 and 6 in their working position on the copy apparatus 1. As in the copy machines of this generic type, the interfaces comprise gripping openings 51 (FIG. 8) for the opening 7 of the cassette involved. In contrast to the known machines with stationary gripping openings 51, in the case of an exemplary copy apparatus 1 according to the invention, the gripping openings 51 may be retracted from a working position in which they protrude laterally to the exposure station 2 from the copy apparatus 1 and into the control location 3 and 4, thereby surrounding the openings 7 of the cassettes in their working position in a light tight manner (FIG. 7), into a second position wherein they release the openings 7 of the cassettes 5, 6 in their working position, and vice versa (FIG. 8). In this manner, with the gripping opening 51 retracted, the cassette crane is able to raise the rear cassette simply and without impediment into its working position, while simultaneously the front cassette is moved by the cassette located behind it transversely to the transport direction T for the copy material M, from its working position. The gripping openings 51 are therefore preferably equipped with motor driven spindle drives 52. According to the exemplary configuration of the gripping opening 51 shown in FIGS. 7 and 8 in the attached position, the spindle drives comprises a spindle nut connected with the gripping opening 51 and a rotatable spindle shaft driven by a variable motor 63. By rotating the spindle shaft clockwise or counterclockwise, the spindle nut is displaced along the spindle shaft and the gripping opening 51 is moved into or out of the copy apparatus 1.

An auxiliary pair of rollers 60 may be moved out or retracted together with the gripping opening 51. The auxiliary pair of rollers 60 on the inlet side is intended to seize the front end of the copy material projecting from the storage cassette and on the outlet side to clamp the rear end detected of the exposed copy material. For this, another motor driven spindle drive 53 is shown below each gripping opening 51 in FIGS. 7 and 8. A mechanical link connected with the mobile spindle nut of the spindle drive moves the two rollers located above each other of the auxiliary pair of rollers 60 toward each other, so that they clamp the front or rear end of the copy material. On the inlet side the auxiliary pair of rollers 60 is motor driven in order to transport the front end of the copy material to a feeder roller pair inside the copy apparatus. As soon as it is detected that the latter had gripped the front end of the copy material, the drive for the auxiliary pair of rollers 60 on the inlet side is deactivated and the spindle drive 53 actuated, in order to move the rollers of auxiliary roller pair 60 apart. On the outlet side, the auxiliary roller pair 60 only serves to clamp the detected rear end of the copy material and therefore does not require a motor drive. The synchronization of the spindle drive 53 for the auxiliary roller drive 60 is effected by a detector not shown in FIGS. 7 and 8 for the rear end of the copy material in the copy material transport path, said detector controlling the clamping of the rollers. The rollers are released following the deactivation of the drive of the winding core of the winding cassette.

The attaching interface locations for the cassettes 5, 6 also comprise means to better hold the cassettes in their working position. For this, under each opening 51 an insertable and retractable arresting sleeve 54 is provided on the copy apparatus 1. The arresting sleeve 54 is capable of engaging releasably a pin 55 located under the cassette opening 7 on the front, or frontal side 71 of the cassette. The arresting sleeve 54 is preferably displaced by means of a spindle drive 56 driven by a variable motor 62. At the bottom side of the sleeve 54, a wedge 58 is provided whereby the cassette attached enters a depression 57 at the bottom side of the pin (FIG. 7). In this manner the attached cassette is secured against unintentional withdrawal.

The wedge 58 is actuated by means of support elements 59, mounted as shown for example in FIGS. 7 and 8 on a pivot arm 42. According to this view, the support elements 59 are in the form of rollers, or rolls, fastened to an arm, which on the one hand depresses the pin 58 on the underside of the sleeve into the depression 57 on the underside of the pin, and on the other hand, serves as a support element for the cassette 5 or 6, preferably suspended in its working position from the cassette crane 11. However, the support elements may also be in the form of a rocker. In this case the suspended cassette 5 or 6 may be supported, for example, by rollers located on the two rocker arms. The arresting wedge 58 is actuated in this case by way of a cam mounted on a connected brace of the two rocker arms.

The suspended position of the cassette in the working location has the advantage that unevenness of the bottom plays no role at all. Independently of the condition of the bottom, the cassette and thus the opening 7 of the cassette may be brought into a well defined position relative to the opening 51, which greatly facilitates its attachment.

In the design of the attaching interface which may engage the cassette opening 7 and the arresting pin 55 on the frontal side 71 of the cassette, particular care was taken to insure that the standard interface elements on the cassette side may be retained without change. It is assured in this manner, that the copy apparatus 1 according to the invention may be inserted into an existing assembly of photographic laboratory devices (wet part, storage) without any further adaptations.

According to an exemplary interface shown on the outlet side 4 in FIGS. 7 and 8, the aforementioned rocker arm 42 carries, in addition to the support elements 59, a drive mechanism 40 for the winding core of the winding cassette 6. In particular, said drive mechanism in the case of the attached cassette 6 and the pivot arm 42 pivoted out, engages the drive transmission means 41 on the winding cassette 6. In the present exemplary embodiment, the drive mechanism consists of a toothed wheel 43 mounted on the pivot arm 42 and driven by a variable motor 64. The pivot arm 42 is moved toward the cassette 6 and away from it preferably by a spindle drive driven by a variable motor 61. In particular, the spindle drive comprises a motor driven spindle nut 45 connected with the copy apparatus 1 and a spindle rod 44 to be extended or retracted depending on the direction of rotation and connected with the pivot arm 42.

The drive transmission means 41 on the cassette are located according to the example shown in FIGS. 7 and 8 of the cassette 6 in the recess 73 sealed toward the light-tight inside of the cassette and located on the frontal surface toward the cassette opening. They obviously could also be located laterally on the cassette 6. The drive transmission elements 41 comprise flat belt 46 with teeth on both sides and running over two toothed wheels 47, 48 located in the recess 73. One of the toothed wheels, in the present example the upper wheel 47, may be deflected over a short distance against the force of a spring in the direction of the second wheel 48. The second toothed wheel 48 is stationary and is connected fixedly in rotation with a third coaxial toothed wheel 49, which in turn is preferably connected by means of a transmission belt 50 with the winding core of the cassette 6. A particular advantage of this configuration of the drive transmission means is that in this manner the drive of the winding core of the cassette is as free of jolts as possible. The toothed wheel 43 protruding into the recess 73 remains engaged with the flat belt 46 even in case of rpm fluctuations due to the motor or lack of balance of the winding core, as the spring supported wheel 44 is able to compensate such irregularities. It is also advantageous that the cassette, aside from the recess 73 in the frontal surface 71 on the cassette side, is closed on all sides. This signifies that the cassette has flat surfaces on all sides; all toothed wheels, flywheels, drive and transmission belts are located inside the cassette case. The light-tight part of the housing with the winding core and the copy material is sealed off from the part of the casing containing the drive transmission means and the winding core drive. Cassettes designed in this manner may be stacked very narrowly without being hooked into each other otherwise hindering the process.

In a similar manner, drive means 40 for the winding core of the storage cassette 5 on the inlet side are provided. Their configuration preferably corresponds to that of the drive means on the outlet side. In operation, the winding core of the storage cassette 5 is driven continuously. The coordination of the drive velocities of the winding core drive and the velocity of the feeder roll pair provided at the inlet in the copy material transport path is assured by applying to the copy material a constant tensile stress of about 10 N-20 N, preferably about 15 N.

In the operation of an exemplary copy apparatus according to the invention, it is no longer necessary for the operators to be constantly available for cassette replacement. It is merely required that an additional cassette be always present in the control location. The copy apparatus automatically detects whether a storage cassette is empty or a winding cassette full. This detection of the emptying or filling state of the cassettes may be effected for example by photoelectrical sensors at the inlet and the outlet of the exposure station. However, it may also be carried out, for example, by a preferably electronic monitoring of the rotating velocities of the winding cores of the cassettes in their working positions and comparing them with set velocities. If the copy apparatus or the monitoring and control, preferably electronic, devices provided therein determine that the storage cassette is empty or the winding cassette full, said monitoring and control device actuates the automatic cassette changing process. Initially, the gripping opening involved, the pivot arm with the drive means and the arresting sleeve, are retracted into the copy apparatus. It is obvious that in the process the light locks in the copy apparatus and the cassettes are tightly closed. The cassette preferably suspended from the cassette crane is then set down, simply by vertically lowering the lift plate. The trolley of the cassette crane then moves into its rear terminal position, whereupon the lift plate slides out from the lateral guides and stops of the front cassette and into the lateral guides and stops of the rear cassette. By raising the lift plate, the locating pins at the lateral edges of the lift plate are inserted into the bores in the lateral guides and stops on the cassette and the cassette raised from the bottom. The trolley of the cassette crane is then automatically returned into its front terminal position. In the process, the rear cassette suspended from the cassette crane pushes the front cassette transversely to the direction of transport for the copy material away from the working position and takes its place. The gripping opening, the arresting sleeve and the pivot arm with the drive means and the support means are not moved out of the copy apparatus to the cassette. The auxiliary pair of rollers on the inlet side clamps the front end of the copy material and moves it to the feeder pair of rolls. The copy material is threaded on the inlet side into the transport path and on the outlet side into the winding cassette in the known manner.

The change of cassettes is fully automatic and always requires the same period of time of about 40 seconds, independently of the skills of the operating personnel and any "reaction times". The copying process is thus interrupted only by the time required for the automatic cassette change. Extended downtimes of the copy apparatus due to inattention by the operators are therefore avoided. Simultaneously, the operating procedure is appreciably facilitated for the personnel. It is no longer necessary for the personnel to be available exactly at the proper moment for cassette changing. In the case of the copy apparatus according to the invention, a time window is available for the operators within which new, full storage cassettes and new empty winding cassettes must be readied in the free rear control locations. This window extends over the entire period of time required for emptying the storage cassette and filling up the winding cassette. In the case of the present high capacity copy machines of the present applicant with a copying rate of up to 20,000 copies per hour and more and the length of copy material housed in the cassettes of about 500 m, the time window amounts to at least 8 to 11 minutes.

The copy apparatus invention is highly compact in its configuration. Its total depth preferably amounts to no more than 80 cm, so that it may be transported through the door frames usually found in buildings. However, it should be emphasized that the space required with the cassettes attached does not significantly exceed the space required for the apparatus itself. The cassettes protrude only slightly from the dimensions of the apparatus. Also, no displacement or traction means are projecting from the apparatus; they could be a dangerous obstacle for the operating personnel if no cassettes are attached. Additional, bulky deflecting means for the copy material, which could also damage the coating of the copy material, are avoided. Altogether, the copy apparatus according to the invention is operator friendly, compact in its configuration and makes possible high copying outputs with the shortest possible downtimes.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all change which come within the meaning and range of equivalents thereof are intended to be embraced therein.

What is claimed is:

1. Photographic copy apparatus for the processing of photographic copy material housed in mobile cassettes with a winding core and a cassette opening comprising: an exposure station; at least one gripping opening provided on the copy apparatus for engaging a cassette opening of a storage cassette or a winding cassette moved into a working position on either side of the exposure station; an automatic transport means for threading the copy material on an inlet side of the copy apparatus from the storage cassette into a transport path for the copy material, and for transporting copy material from an outlet side of the copy apparatus into the winding cassette, either side of the exposure station of the copy apparatus having at least two cassettes combined into a block so that cassette openings of storage cassettes on the inlet side and winding cassettes on the outlet side are approximately opposite each other in approximate alignment with the transport path for the copy material and with a parallel extending behind said transport path relative to a depth of the apparatus; and at least one transport device for moving the cassettes combined into a block on at least one of the inlet and outlet sides of the copy apparatus, said transport device being provided on the copy apparatus transversely to the transport path for the copy material so that a cassette on a given side of the copy apparatus in a rear position relative to a depth of the copy apparatus is moved into its working position, while simultaneously a cassette in a front position on said given side is moved in a direction perpendicular to the transport path out of the working position.

2. Apparatus according to claim 1, wherein each cassette transport device includes a cassette crane, said apparatus further including: a transport device located on both the inlet and the outlet side of the copy apparatus above the cassettes and capable of moving transversely to the transport path for the copy material.

3. Apparatus according to claim 2, wherein, each cassette crane further comprises: a trolley for moving in lateral guides provided transversely to the transport path for the copy material in the copy apparatus, said trolley further moving horizontally from a first terminal position into a second terminal position; and a lift plate located under the trolley, said lift plate moving together with the trolley horizontally and being vertically adjustable relative to said trolley.

4. Apparatus according to claim 3, wherein the lift plate further includes: a plurality of spindle columns carried by the lift plate and extending vertically upward from a first top side of the lift plate and engaging rotatable spindle nuts located on the trolley such that the lift plate may be raised and lowered by rotation of the spindle nuts.

5. Apparatus according to claim 4, further including: a toothed belt for coupling the spindle nuts located on the trolley with each other and for driving the spindle nuts together, by a variable drive motor and a drive belt.

6. Apparatus according to claim 5, wherein the horizontal motion of the trolley takes place with the aid of a spindle drive comprising: a drive motor connected with a frame of the copy apparatus, a rotating spindle rod connected with a rotor of the motor and another spindle nut connected with the trolley, wherein the spindle rod engages the another spindle nut such that by rotating the spindle rod, the another spindle nut and the trolley are displaced along a threaded part of the spindle rod.

7. Apparatus according to claim 3, wherein the lateral guides for the trolley in the copy apparatus further include: a slot guide in which a support roll located laterally on the trolley moves between two terminal positions, said terminal positions being formed as trough like depressions; and a support shaft running through a bore in the trolley parallel to the horizontal direction of trolley motion.

8. Apparatus according to claim 3, wherein the lift plate further comprises: two locating pins on its transverse edges which, following introduction of the lift plate into two lateral guides and stops located on the first top side of the cassette transversely to the transport path for the copy material, are inserted into bores in the lateral stops.

9. Apparatus according to claim 8, further including: two guide columns extending from a first top side of the lift plate, said columns being inserted into two corresponding guide bores in the trolley.

10. Apparatus according to claim 3, wherein the width of the lift plate is approximately equal to or less than the width of the cassettes.

11. Apparatus according to claim 3, further including: approximately parallelepiped shaped control locations provided on the inlet and the outlet side of the exposure station of the copy apparatus for the at least two cassettes combined in a block such that a block of attached cassettes project only slightly over the longitudinal extent of the copy apparatus.

12. Apparatus according claim 11, wherein a total depth of the copy apparatus at the cassettes located in the control locations does not exceed 80 cm.

13. Apparatus according to claim 12, further including: positioning means on the copy apparatus to fixate positions of the cassettes in their control locations.

14. Apparatus according to claim 3, wherein the copy apparatus on both the inlet and the outlet side of the exposure station further comprises: a drive mechanism for each of the storage cassette and the winding cassette winding cores, with each said drive mechanism being movable from a first position wherein it engages drive transmission means on cassettes attached to the copy apparatus, into a second position wherein it is out of engagement with said drive transmission means.

15. Apparatus according to claim 14, wherein each drive mechanism projects in a first attached position in to a recess of a frontal surface on a side of a cassette opening of the cassette in which a drive transmission means is located.

16. Apparatus according to claim 15, wherein each drive mechanism for a winding core includes: a motor drive toothed wheel mounted on a pivot arm, and each drive transmission means includes, in the recess on the frontal side of a cassette, a flat belt toothed on both sides, said belt running over two toothed wheels, one of which may be deflected for a short distance against a spring force in a direction of the second toothed wheel, while the second toothed wheel is stationary and is connected fixedly in rotation with a third coaxial toothed wheel, which is coupled by a transmission belt with the winding core.

17. Apparatus according to claim 16, wherein the pivot arm is connected with a spindle drive comprising: a spindle rod connected with a motor rotated spindle nut stationarily located in the copy apparatus, so that by rotating the spindle nut in the clockwise or counterclockwise direction, the spindle rod is moved into or out of the copy apparatus to pivot the pivot arm from one terminal position into the other, and vice versa.

18. Apparatus according to claim 3, further comprising: gripping openings provided at both the inlet and the outlet sides of the exposure station on the copy apparatus, each gripping opening being retractable from one working position wherein it protrudes laterally from the exposure station from the copy apparatus and surrounds a cassette opening in a light-tight manner, into a second position in which it releases the cassette opening of the cassette still in the working position for exchange of one cassette for another.

19. Apparatus according to claim 18, wherein each gripping opening further includes: a motor and a spindle drive for extending and retracting the gripping opening.

20. Apparatus according to claim 19, wherein each gripping opening further includes: an auxiliary pair of two rollers located within the gripping opening for clamping of the copy material.

21. Apparatus according to claim 20, wherein the two rollers of each auxiliary roller pair are located in a slightly protruding manner in the transport path for the copy material, said apparatus further including: a spindle drive located under the gripping opening for moving the rollers together or separately.

22. Apparatus according to claim 20, further including: a motor driven arresting sleeve under each gripping opening on the copy apparatus; and a spindle drive for moving said arresting sleeve in and out, and releasably engaging a corresponding pin located under the cassette opening on the frontal surface of the cassette.

23. Apparatus according to claim 3, wherein the cassettes are suspended in their working position on corresponding cassette cranes.

* * * * *